Patented Oct. 5, 1943

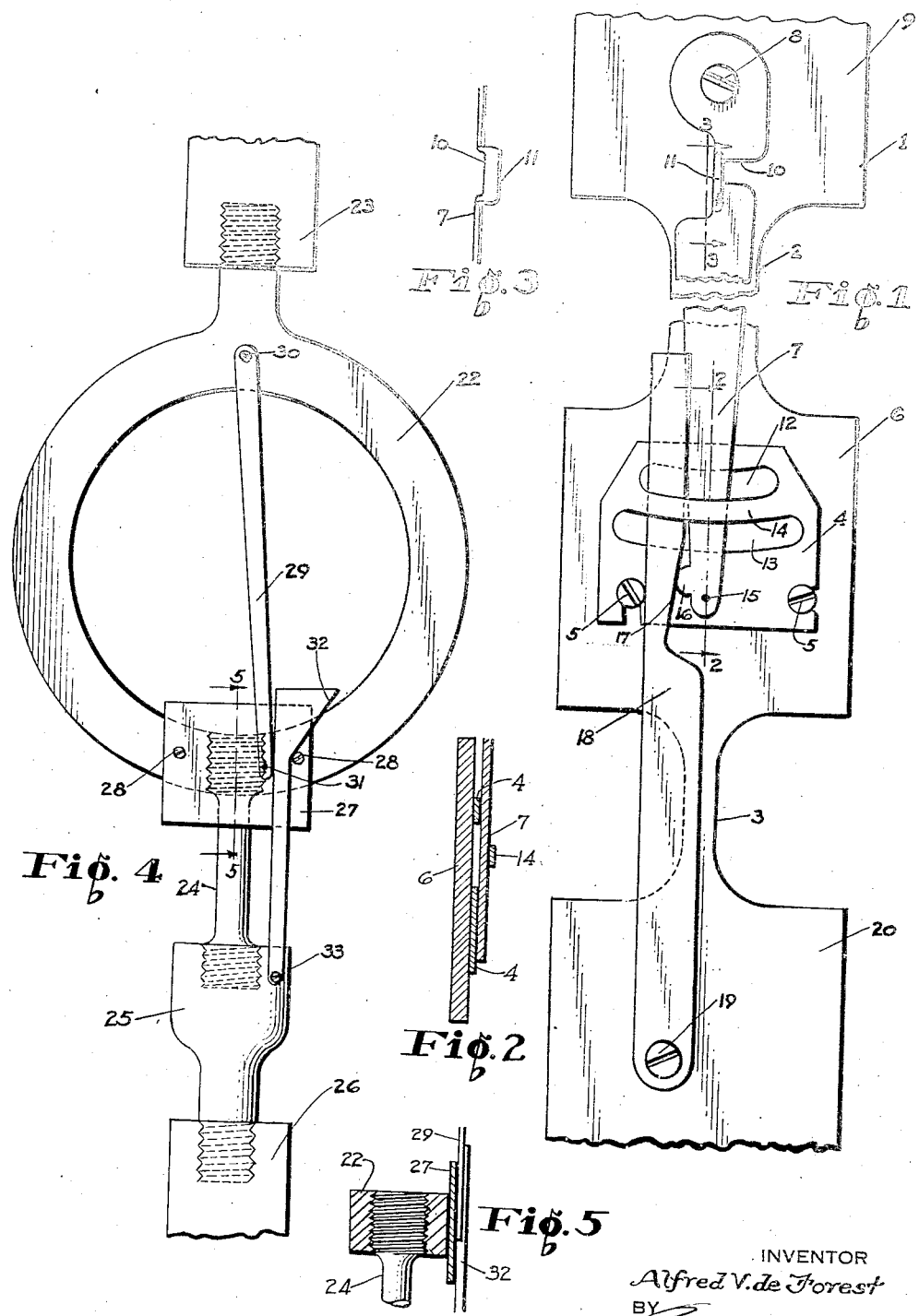

2,330,959

UNITED STATES PATENT OFFICE 2,330,959

STRESS-STRAIN RECORDER

Alfred V. de Forest, Marlboro, N. H., assignor to The Baldwin Locomotive Works, a corporation of Pennsylvania Application February 6, 1941, Serial No. 377,713

9 Claims. (Cl. 265—2).

This invention relates generally to stress-strain recording apparatus and more particularly to a scratch gauge type of recorder.

Various arrangements have heretofore been proposed and used for determining and recording stress-strain characteristics of a specimen of material but these devices are generally large and expensive and involve complications that are justified only where it is desired either to have permanent recording equipment adapted for many years of use or to have a stress-strain record of such size that it may be read directly with the naked eye without using a microscope as is necessary with my present invention.

It is an object of my invention to provide an improved stress-strain recorder that is extremely simple in construction and operation as well as having a very low initial cost but nevertheless being adapted to obtain precision results.

A further object is to provide an improved stress-strain recorder that does not depend upon an external amplifying power for moving the recording stylus over the recording surface. Another object in this respect is to provide an improved and simplified scratch type stress-strain recorder whose sole actuating force for recording both the stress and strain components is obtained directly from the load transmitted through the specimen thereby eliminating external sources of amplifying power.

In the specific aspects of my invention I accomplish the foregoing objects by providing weigh bar means in combination with a specimen and attach thereto a scratch gauge whose marker is moved in one direction by the deformation of the weigh bar means thereby recording stress and is moved at right angles by the deformation of the specimen thereby recording strain. The resultant movement is a stress-strain diagram.

Other objects and advantages will be more apparent to those skilled in the art from the following description of the accompanying drawing in which:

Fig. 1 is an elevational view of my improved stress-strain recording scratch gauge;

Fig. 2 is a vertical section taken substantially on the line 2—2 of Fig. 1;

Fig. 3 is a vertical section being substantially on the line 3—3 of Fig. 1;

Fig. 4 is an elevational view of a modified form of my recording arrangement;

Fig. 5 is a vertical section taken on the line 5—5 of Fig. 4.

In the particular embodiments of the invention such as are disclosed herein merely for the purpose of illustrating certain specific forms among possible others that the invention might take in practice, I have shown in Fig. 1 a single member generally indicated at 1 having a relatively large stress section 2 which broadly functions as a weigh bar means and a reduced breaking section 3 functioning as a specimen. The member 1 may be flat sheet metal or round stock, but in any case the upper and lower ends of the member 1 are secured in grips (not shown) of usual materials testing machines which are well-known and hence need not be described or shown. As is customary the load is applied axially to member 1 either in tension or compression depending upon the character of test desired.

The recording instrument as shown in Fig. 1 preferably includes a scratch gauge of the type shown in my Patent No. 2,099,725 consisting generally of a target 4 removably secured as by screws 5 to an enlarged intermediate section 6 of member 1 while a marker arm 7 is removably rigidly secured as at 8 to the upper enlarged end 9 of member 1. The marker arm 7 has a recessed portion 10 adjacent a combined spring and fulcrum portion 11 which is turned upwardly from the adjacent flat metal portions of the arm. The arm 7 extends through a pair of slots 12 and 13 of the target 4 and beneath a spring clip 14 formed as an integral part of target 4. The free end of the marker arm has a suitable marking or scratch point diagrammatically indicated at 15 and which may be of the type disclosed more fully in my said patent. A cam follower portion 16 is preferably formed on arm 7 for engagement with the side of a strain actuated cam 17 formed on an arm 18, the lower end of which is secured at 19 to an enlarged gripping portion 20 of member 1, while the upper portion of arm 18 bears against the side of left hand screw 5. The cam follower action of element 16 is maintained during either tension or compression tests by spring 11 biasing the follower into contact with the cam.

In the operation of Fig. 1 the enlarged portions 9 and 20 are suitably gripped in a testing machine and pulled in the case of a tension test or compressed in a compression test. The section 2 is preferably of sufficient area to remain within its elastic limit up to the point of rupture of the reduced section 3. Hence the section 2 functions in the nature of a weigh bar and the strain or deformation thereof is proportional to the load. The deformation of the weighing section causes relative vertical movement between target 4 and marker point 15. On the other hand, deformation of reduced section 3 represents the actual strain component of the material resulting from any given applied load and such deformation causes arm 18 to move cam section 17 vertically relative to cam follower 16 and accordingly moves marker point 15 laterally over target 4. The stress and strain components are simultaneously operative and hence marker 15 will scratch the resultant stress-strain curve on target 4. This curve may then be suitably magnified by a microscope so that observations, photographs and measurements may be easily taken thereof.

This arrangement provides an extremely simple and yet highly effective and precise means for obtaining a stress-strain record of any given material and the device is sufficiently inexpensive that its target 4 or other elements may be readily discarded after reasonable use has been obtained therefrom.

In the modification of Fig. 4, I employ the same principles of the Fig. 1 form but herein I provide a weigh bar means in the form of an elastic ring 22 adapted to be secured to the loading head 23 of a testing machine while its lower end is secured to a specimen 24. This specimen may be either flat, round or other shape but is specifically shown herein as of the round type having threaded ends one of which is received in the ring 22 and the other in an adapter 25 which, in turn, is secured in a gripping portion 26 of the testing machine. A target 27 is removably secured as by screws 28 to the ring 22 while a marker arm 29, pivotally secured as at 30 to the ring, has a suitable marking point 31 for inscribing a line on target 27. A strain operated cam arm 32 is pivotally secured at 33 to head 25 and its cam surface bears against the side of screw 28.

In the operation of this Fig. 4 device, the elastic ring 22 will deform in proportion to the applied load thereby causing arm 29 to move vertically relative to target 27. This movement will represent the load in the same manner as in the Fig. 1 form. The strain of specimen 24 will cause cam arm 32 to move say downwardly relative to screw 28 and accordingly laterally move the lower end of arm 29 which has sliding contact with the side of cam arm 32. Accordingly the marker 31 will scratch a stress-strain record on the surface of target 27. A microscope may then be employed to magnify the curve in the manner previously described. This arrangement allows the weigh means 22 to be used for an indefinite period and to allow weigh rings of different capacities to be employed depending upon the size of specimen under test, it being understood that the weighing ring is calibrated so that any given deformation represents a given load.

It will be understood that the taper of cams 32 or 17 is such as to give a scratch diagram of normal proportions so that the complete scratch record can be read under the microscope.

It is thus seen that in both modifications an extremely simple, inexpensive and yet highly precise stress-strain recording instrument is provided and that by merely replacing target 4 or 27 it will be possible to use the apparatus for a considerable length of time. No external source of amplifying power is required, the whole apparatus being self-contained and of light weight so that distortions are not introduced.

It will of course be understood that various changes in details of construction and arrangement of parts may be made by those skilled in the art without departing from the spirit of the invention as set forth in the appended claims.

I claim:

1. A stress-strain recorder comprising, in combination, a target and a scratch arm, means mechanically connected to a test member at axially spaced points thereof for relatively moving said target and arm in one direction in direct response to strain of a test member, a deformable responsive member through which load is transmitted to the test member, and means for mechanically connecting said target and arm to said deformable member for relatively moving said target and arm in another direction in response to stress in said member, thereby producing a stress-strain diagram.

2. A stress-strain recorder comprising, in combination, a deformable load weighing means and a specimen connected thereto, means operated by the deformation of said weighing means to record stress of the specimen, and means responsive to the specimen strain for directly mechanically acting upon said stress responsive means and for imparting movement thereto that is greater than the deformation of the load weighing means, thereby to produce a stress-strain resultant.

3. A stress-strain recorder comprising, in combination, deformable load weighing means normally operable within its elastic limit and having a specimen formed as a unit therewith, means forming a recording surface adjacent one end of said weighing means, a marker arm connected to said weighing means on the opposite end thereof whereby deformation of said weighing means in response to load applied thereto causes relative movement in one direction between the marker arm and recording surface, and a cam member connected to said specimen at a point thereof so as to be movable in response to the specimen strain, said marker arm having slidable follower contact with said cam member and said cam being so shaped that the cam is able to move said marker arm in a direction different from said other direction, thereby producing a diagram having a stress component in one direction and a strain component in another direction.

4. A stress-strain recorder comprising, in combination, a scratch plate, a stress responsive scratching arm movable in one direction over said plate in response to stress in a member, and means responsive to strain of said member for moving said scratching arm in a direction substantially at right angles to the direction of stress response, thereby producing a stress-strain diagram.

5. A stress-strain recorder comprising, in combination, a deformable load weighing member and a specimen connected to one side thereof for having load transmitted thereto through said member, a removable target associated with said weighing member and specimen, a marker arm pivotally supported in a predetermined relation to said weighing member so as to be movable over said target in a direction axially of the applied load, and a cam member pivotally supported in a predetermined relation to one end of said specimen and extending for the length thereof so as to be responsive to strain therein, said marker arm having slidable follower contact with said cam member and said cam being so shaped that the cam is able to move said arm transversely over said target, whereby a stress-strain diagram is produced.

6. The combination set forth in claim 5 further characterized by the provision of means for frictionally engaging said marker arm and said cam member thereby to maintain the same in operative relation to each other.

7. The combination set forth in claim 5 further characterized by the provision of means against which one side of said cam member abuts so as to cause its cam surface to move the target arm transversely across the target.

8. In combination, a combined deformable weighing member and specimen, means forming a permanent record receiving surface, and means supported by said combined member for mechanically scratching a stress-strain diagram of said specimen on said record receiving surface.

9. In combination, a combined deformable weighing member and specimen, means forming a record receiving surface rigidly connected to said combined member at a point between said deformable weighing portion and the specimen, a stress responsive member connected in a fixed manner to one end of said weighing member so as to be movable fully with the deformation thereof, said stress responsive member extending for substantially the full axial distance of said weighing member and terminating adjacent said recording surface, and a strain responsive member connected in a fixed manner to said specimen so as to be movable fully with the deformation thereof, said strain responsive member extending for substantially the full axial length of said specimen and also terminating adjacent said surface for cooperation with said stress responsive member to produce a stress strain diagram of said specimen.

ALFRED V. DE FOREST.